Figure 1:
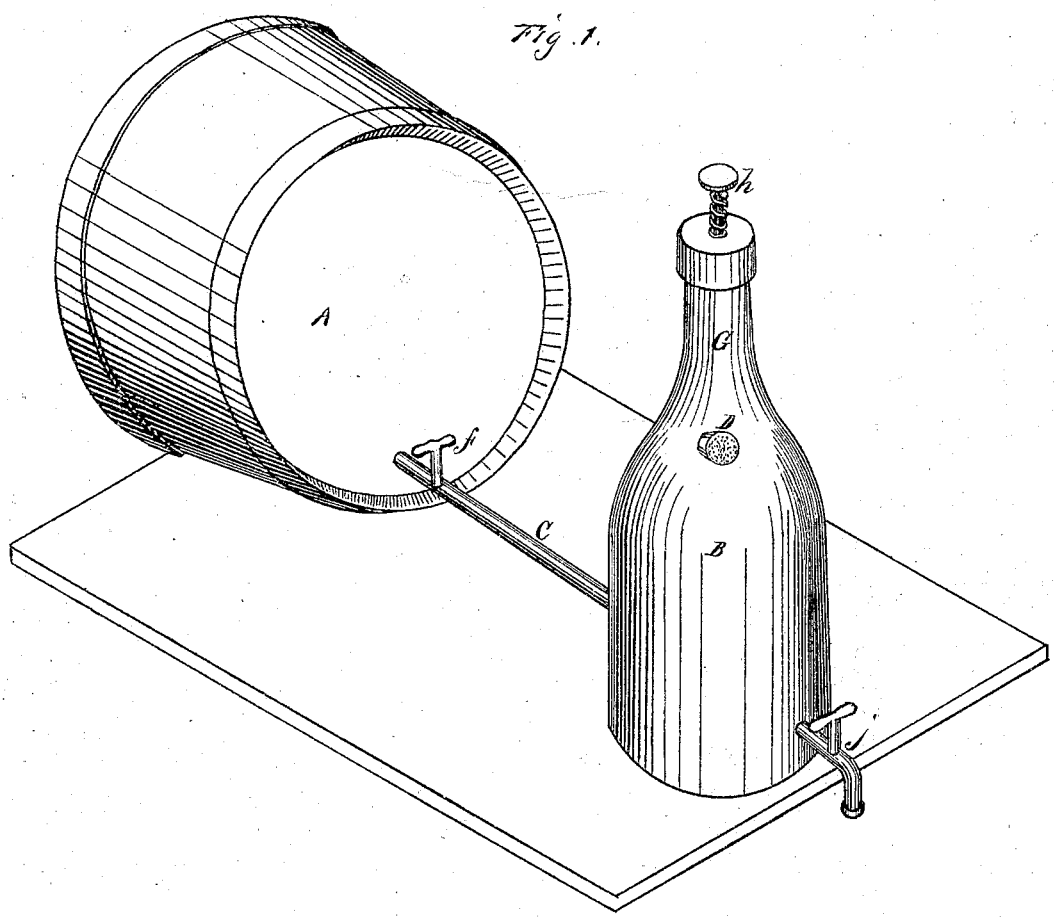

S. MARKS.
Beer-Drawing Attachments for Casks, &c.

No. 144,119.                    Patented Oct. 28, 1873.

Witnesses
John L. Borne
C. M. Richardson

Samuel Marks
per Dewey & Co.
Attys

UNITED STATES PATENT OFFICE.

SAMUEL MARKS, OF SAN FRANCISCO, CALIFORNIA.

IMPROVEMENT IN BEER-DRAWING ATTACHMENTS FOR CASKS, &c.

Specification forming part of Letters Patent No. 144,119, dated October 28, 1873; application filed June 28, 1873.

*To all whom it may concern:*

Be it known that I, SAMUEL MARKS, of San Francisco city and county, State of California, have invented a Beer-Drawing Attachment for Casks, &c.; and I do hereby declare the following description and accompanying drawings are sufficient to enable any person skilled in the art or science to which it most nearly appertains to make and use my said invention without further invention or experiment.

The object of my invention is to provide an attachment to a cask or other vessel by means of which beer, ale, or porter, under a pressure of gas, can be drawn into glasses, bottles, or other vessels without the usual excess of foam, but regulated by the operation from brisk sprinkling to any extent of foam desired; and it consists of a receptacle having a controllable valve and a porous plug in it, arranged between the keg and the point of drawing the beer, whereby I am enabled to allow the escape of more or less of the gas from a small quantity of the beer in said receptacle.

In order to explain my invention, so that others will be able to understand its construction and operation, reference is had to the accompanying drawings forming a part of this specification, in which—

Figure 1 is a perspective view of my invention.

Let A represent a beer-cask, from which the beer, ale, or porter is to be drawn. B is a receiver or vessel, which is connected with the cask by a tube or pipe, C. This connection can be made either directly with the cask or with the ordinary faucet, through which the beer is usually drawn. The pipe C has a cock, $f$, which can be used to cut off communication between the cask and receiver when the pipe or tube connects directly with the cask; but, when the attachment is made to the ordinary faucet, no extra cock will be necessary, as the faucet can be used. The vessel or receiver B can be made in any desired shape or size. I prefer to construct it with a neck, G, similar to a bottle-neck, so as to render it more convenient to apply a valve, $h$, at the mouth; but the valve can be applied to any other convenient part of the vessel. This valve is kept closed by a spring, and when it is desired to admit air to the interior of the vessel the valve can be opened by pressing the spring down with the finger. D is a porous plug, which I insert in an opening in the vessel at some point near its upper end, so that it will be above the level of the beer. This plug can be made of wood, stone, or any other substance, through which the gas will penetrate. This plug will allow the main portion of the gas to slowly escape from the vessel, while the liquor will remain unflat. At the lower end of the vessel or receiver A is a cock or faucet, $j$, through which the beer can be drawn from the receiver.

This beer-cask attachment will be especially valuable to retailers, who can place the keg of beer out of sight, and have the receiver, which is connected with it by a hose or pipe, placed upon the counter in the room where the beer is to be drawn. The receiver will then generally be kept partly filled with beer, and, when it is desired to draw it off into a glass, the cock $f$, or faucet which cuts off the communication between the cask and receiver, can be turned so as to regulate the flow and pressure of beer into the receiver, and thus enliven the beer and give it any quantity of foam desired.

Having thus described my invention, what I claim, and desire to secure by Letters Patent, is—

The vessel B, having suitable connections for receiving and drawing off the beer, in combination with the porous plug D and controllable valve $h$, substantially as described, for the purpose set forth.

In witness whereof I hereunto set my hand and seal.

SAMUEL MARKS. [L. S.]

Witnesses:
 JOHN L. BOONE,
 C. M. RICHARDSON.